M. B. POMERENE.
DILATING FORCEPS.
APPLICATION FILED FEB. 2, 1912.
1,170,324.
Patented Feb. 1, 1916.
2 SHEETS—SHEET 2.
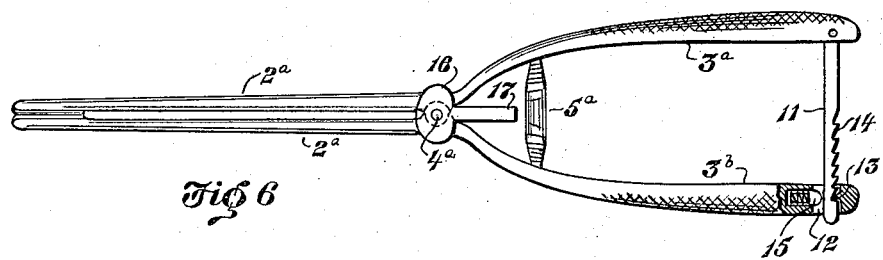
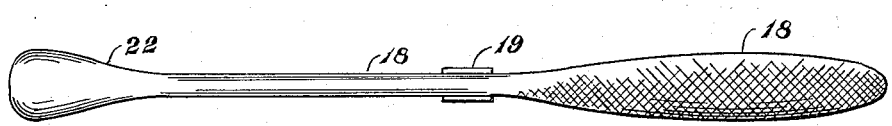
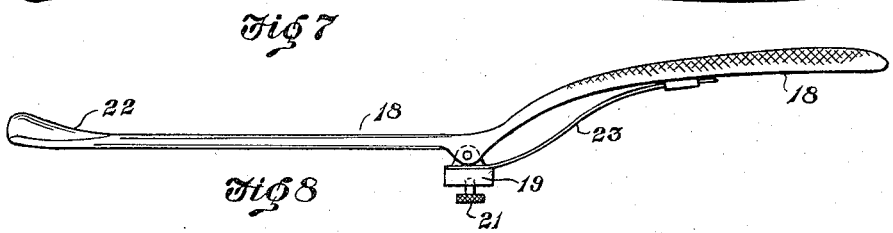
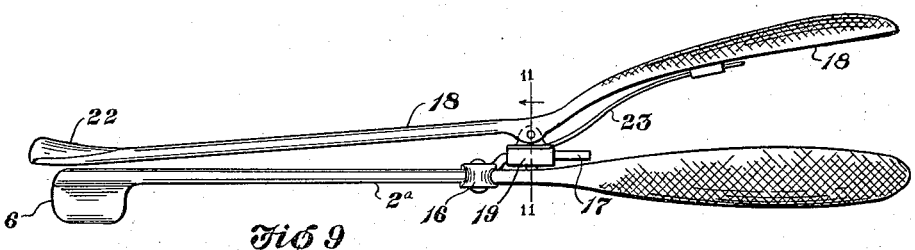
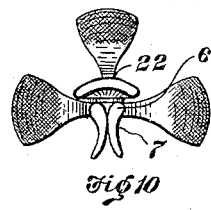
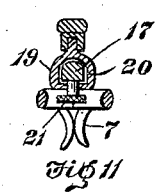
Witnesses:
Inventor
Myron B. Pomerene
By Harry Frease
Attorney
THE COLUMBIA PLANOGRAPH CO., WASHINGTON, D. C.

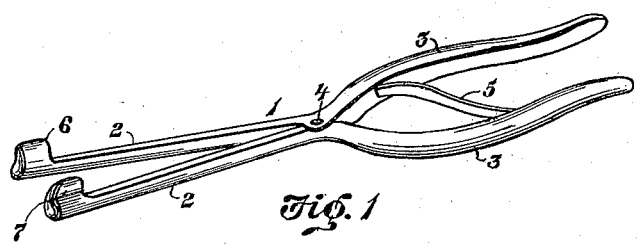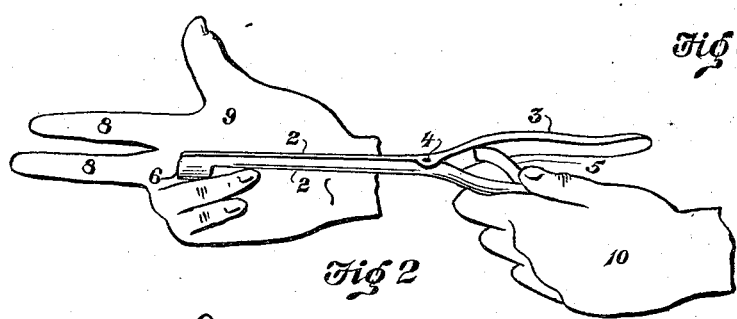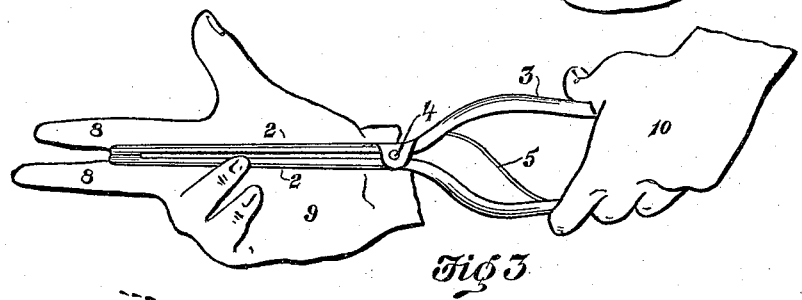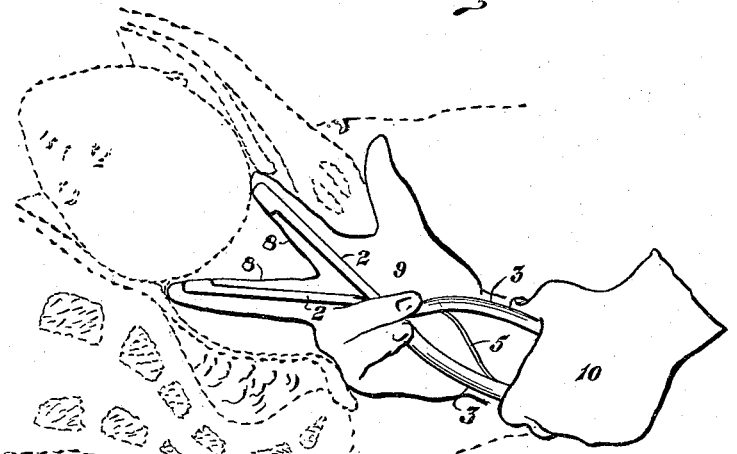

UNITED STATES PATENT OFFICE.

MYRON B. POMERENE, OF BERLIN, OHIO.

DILATING-FORCEPS.

1,170,324.  Specification of Letters Patent.  Patented Feb. 1, 1916.

Application filed February 2, 1912. Serial No. 674,984.

*To all whom it may concern:*

Be it known that I, MYRON B. POMERENE, a citizen of the United States, residing at Berlin, in the county of Holmes and State of Ohio, have invented certain new and useful Improvements in Dilating-Forceps, of which the following is a specification.

The invention relates to an obstetrical instrument for use in conjunction with the fingers of the operator's hand, as for dilating the os uteri during child-birth. An obvious difficulty in the direct application of an instrument of this character is that the blades will easily slip from their position and are apt to lacerate the os uteri, or injure the child or the surrounding parts, or catch contiguous tissue. On the other hand, it is practically necessary to accompany the use of a dilating instrument with the direct touch of the operator's fingers, for exploring the parts and determining to what extent dilation is necessary or desirable; and, more important, to prevent an injury to the mother or the child by the use of the dilating instrument or other form of forceps.

The difficulties and dangers thus briefly described are avoided and overcome by employing dilating forceps having flanges upon its blades or arms to form seats or rests for the fingers of the operator, which forceps are preferably so formed that its arms can be inserted along the palm of the operator's hand after the fingers have been inserted for exploration, whereby the ends of the fingers being inserted in the os uteri can be forcibly separated to dilate the same without the instrument pressing against any portion of the uterus or coming in contact with the child.

The purposes and objects of the improvements, thus set forth in general terms, are attained by the construction, mechanism and arrangement of the preferred embodiment of the invention illustrated in a simple form, and also with supplemental features, in the accompanying drawings, in which—

Figure 1 is a perspective view of the simple form of the forceps, showing the arms slightly spread apart; Fig. 2, a perspective view of the forceps, showing the flanges turned flatwise along the palm of the hand for inserting along the same; Fig. 3, a perspective view of the forceps with its flanges entered between the exploring fingers during its insertion; Fig. 4, a perspective view showing the use of the forceps in operative position; Fig. 5, a perspective view showing a pair of finger shields; Fig. 6, a plan view of the forceps adapted for the use of a third arm; Fig. 7, a plan view of the third arm; Fig. 8, a side view of the third arm; Fig. 9, a side view of the forceps with the third arm applied thereto; Fig. 10, an end view of the forceps with the third arm as shown in Fig. 9; and Fig. 11, a section on line 11, Fig. 9.

Similar numerals refer to similar parts throughout the drawings.

The simple form of the forceps 1, as shown in Figs. 1 to 4, inclusive, is composed of the substantially straight arms 2 and the handles 3 operatively joined or fulcrumed, as by the pivot 4, so that the free ends of the arms may be spread apart by pressing the handles toward each other, a suitable spring 5 being preferably provided to normally spread the handles apart and hold the arms together.

On one side only of the free end portions of the arms are provided laterally extending flanges 6, the outer or remote sides 7 of which are preferably concavely curved to form suitable seats or rests for the inner or adjacent sides of the exploring fingers 8 of the operator, and the edges as well as the ends and sides of the flanges and the arms are suitably rounded and smoothed to avoid any cutting or scraping effect.

In use, the first two fingers 8 of one hand 9 of the operator are inserted in the vagina of the mother for exploring the condition of the os uteri, and when the same has naturally dilated sufficiently to permit the entrance of the finger tips therein, and further natural dilation is slow and tedious, the arms of the forceps are inserted along the palm of the hand, with the flanges turned flatwise therewith as shown in Fig. 2, until the two flanges reach the interval between the two exploring fingers, whereupon the forceps are slightly turned until the flanges enter between the two exploring fingers, as shown in Fig. 3; after which the arms are further inserted to bring the flanges alongside the end portions of the fingers, whereupon the handles of the forceps are pressed together by the other hand of the operator, whereby the arms and flanges of the instrument and the exploring fingers of the operator are spread apart to dilate the os uteri as may be desired; during which operation the exploring fingers need not be withdrawn from the os uteri and can constantly remain in touch with the child, and at the same time the instrument does not impinge or press against the uterus, the child, or the surrounding parts or tissues.

When it is desired to dilate the os uteri in a third direction, a third arm may be applied to the simple form of the forceps, as shown in Figs. 6 to 10 inclusive. For the use of a third arm, a modified form of spring $5^a$ is preferably employed to normally spread the handles $3^a$ and $3^b$ apart; and suitable means for positively holding the handles together, when the blades are spread, are preferably provided, as the ratchet bar 11 pivoted to the free end of one handle and passing through the slot 12 in the other handle, in one end of which slot is provided a detent 13 for engaging the ratchet teeth 14 and in the other end the pressure foot 15 for normally holding the ratchet teeth in engagement with the detent. The pivot $4^a$ of the finger-rest arms $2^a$, is preferably formed or engaged in the joint bracket 16, on which bracket is secured or formed the shank 17 for the third arm 18, which shank extends rearwardly from the joint bracket on one side of and adjacent to the plane of the handles $3^a$ and $3^b$. The joint block 19 is pivoted or hinged on the inner side of the third arm 18 and is provided with a longitudinal aperture 20 for receiving and sliding along the shank 17, on which shank the block may be secured in any desired position by the set screw 21, one side of the aperture and shank being formed flat to prevent a rotation of the block on the shank. The free end of the third arm is laterally widened to form the blade 22, which is preferably curved or flared as the section of a horn and has all edges rounded and smoothed to avoid cutting or scraping action. The blade of the third arm is preferably extended beyond the ends of the finger-rest arms so the blade will terminate opposite the tips of the operator's fingers; and the spring 23 may be secured to the joint block and be extended along the handle of the third arm 18, for normally spreading the handle and holding the blade of the third arm adjacent to the ends of the finger-rest arms.

In use, the finger-rest or digital forceps are inserted and operated as described above for dilating the os uteri in two directions, and the spread arms are held in any position of separation by means of the ratchet bar of the handle. After such initial dilation it is usually desirable to close the arms of the digital forceps toward each other to release the fingers for further exploration before the third arm is inserted, which is readily done by pressing the ratchet arm to disengage the teeth from the detent. Thereupon, the third arm is inserted alongside the digital forceps and the joint block slipped over and along the shank 17 until the blade of the third arm has entered the os uteri to bring the flared end of the blade well within the same, as may be guided and determined by the inserted fingers, whereupon the joint block is clamped to the shank by the set screw and the handle of the third arm pressed toward the other arms to spread the blade from the digital arms and dilate the os uteri in the third direction, which spreading may be accompanied by a further spreading of the digital arms. It will be understood that the feeling and guiding of the operator's fingers while the blade of the third arm is being inserted and operated, reduces to a minimum the danger of damage from a slipping of the blade or the direct contact of the same; which danger is furthermore minimized by the flared or horn-shaped end of the blade, the insertion of which is rendered possible by the preliminary dilation made by the digital arms.

In cases of extreme rigidity of the os uteri, a pair of protecting thimbles 11, as shown in Fig. 5, may be used on the end portion of the fingers to receive and transmit the pressure of the forceps, without unduly interfering with or impairing the freedom of the feeling thereof; and, while the invention has been described and illustrated more particularly with reference to its use in dilating the os uteri, it will be understood that it is not intended to limit the scope of the invention to such use, for it is obvious that the instrument can as well be used for dilating any passage, orifice or meatus large enough to admit the entrance of the ends of the operator's fingers.

To those skilled in the arts of making and using instruments of the class described, many alterations in construction and widely differing embodiments and applications of this invention will suggest themselves, without departing from the spirit and scope thereof.

The disclosures and description herein are purely illustrative, and are not intended to be in any sense limiting.

I claim:

1. Dilating forceps having substantially straight arms with smooth-edged flanges forming finger rests on one side only of the ends thereof.

2. Dilating forceps having substantially straight arms with smooth-edged concaved flanges forming finger rests on one side only of the ends thereof.

3. Dilating forceps including two substantially straight arms jointed together and having smooth-edged finger rests on one side only of the ends thereof, and a third arm detachably hinged on the joint of the two arms and having a horn-shaped blade on its free end.

MYRON B. POMERENE.

Witnesses:
D. O. KENDALL,
CHARLES R. CARY.

Copies of this patent may be obtained for five cents each, by addressing the "Commissioner of Patents, Washington, D. C."